(12) United States Patent
Yamaguchi et al.

(10) Patent No.: US 11,681,163 B2
(45) Date of Patent: Jun. 20, 2023

(54) PAIR OF PROGRESSIVE POWER LENSES AND DESIGN METHOD FOR THE SAME

(71) Applicant: HOYA LENS THAILAND LTD., Pathumthani (TH)

(72) Inventors: Eiichiro Yamaguchi, Tokyo (JP); Toshiaki Sonehara, Tokyo (JP); Ayumu Ito, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 93 days.

(21) Appl. No.: 17/212,582

(22) Filed: Mar. 25, 2021

(65) Prior Publication Data

US 2021/0302761 A1 Sep. 30, 2021

(30) Foreign Application Priority Data

Mar. 30, 2020 (JP) .............................. JP2020-059538

(51) Int. Cl.
*G02C 7/06* (2006.01)
*G02C 7/02* (2006.01)

(52) U.S. Cl.
CPC ............. *G02C 7/061* (2013.01); *G02C 7/027* (2013.01)

(58) Field of Classification Search
CPC ................................. G02C 7/027; G02C 7/061
USPC ..................................................... 351/159.42
See application file for complete search history.

(56) References Cited

U.S. PATENT DOCUMENTS

| | | | |
|---|---|---|---|
| 2011/0211159 A1 | 9/2011 | Suzuki | |
| 2014/0016120 A1* | 1/2014 | Kitani | G02C 7/065 356/124 |
| 2015/0212338 A1* | 7/2015 | Qi | G02C 7/025 351/159.75 |

FOREIGN PATENT DOCUMENTS

| | | |
|---|---|---|
| JP | H04-338918 A | 11/1992 |
| JP | 2011-203705 A | 10/2011 |
| JP | 2016-26324 A | 2/2016 |

OTHER PUBLICATIONS

Aug. 9, 2021 Search Report issued in European Patent Application No. 21160405.3.
Werner Köppen. "Konzeption und Entwicklung Von Progressivgläsern". Deutsche Optikerzeitung, Opt. Fachveroeff., Heidelberg, DE, Oct. 31, 1995, pp. 42-46.

* cited by examiner

*Primary Examiner* — James R Greece
(74) *Attorney, Agent, or Firm* — Oliff PLC

(57) ABSTRACT

A pair of progressive power lenses and related techniques thereof are provided, wherein a power distribution on a horizontal cross-section of the right eye lens has a peak at a position that is away from a main gaze line, and a power distribution on a horizontal cross-section of the left eye lens has a peak at a position that is away from a main gaze line in a direction opposite to that of the right eye lens.

10 Claims, 8 Drawing Sheets

AA = Binocular frontal gaze average power BP
BB = Monocular maximum power MP
CC = Visual field width W at threshold
DD = Monocular maximum power positional difference d

PAIR OF PROGRESSIVE POWER LENSES AND DESIGN METHOD FOR THE SAME

BACKGROUND OF THE INVENTION

Field of the Invention

The present invention relates to a pair of progressive power lenses and a design method for the same.

Description of Related Art

JP 2011-203705A discloses a technique for allowing a wearer to clearly view a nearby object in binocular vision using near regions of eyeglass lenses, irrespective of the horizontal position of the object, in which plus power is added on the right side (the ear side) of a near dioptric power measurement point NP (a near dioptric power measurement point in this specification) and minus power is added on the left side (the nose side) of the near dioptric power measurement point NP compared with conventional design examples ([0027], FIG. 2, and ABSTRACT).

JP 2011-203705A is an example of related art.

According to FIG. 2 of JP 2011-203705A, the power is higher than the near dioptric power (i.e., spherical power+ additional power) on the right side (the ear side) of the near dioptric power measurement point. If a power error occurs as a result of intentionally adding power, the wearer's vision is blurred or an image becomes distorted, which may reduce the wearing comfort.

SUMMARY OF THE INVENTION

It is an object of an embodiment of the present invention to provide a technique for improving the wearing comfort in binocular vision.

A first aspect of the present invention is directed to a pair of progressive power lenses including a right eye lens and a left eye lens that are progressive power lenses,
wherein, in a case in which each of a portion on the right eye lens and a portion on the left eye lens through which a line of sight passes in a frontal gaze in which a wearer views an object that is located on a median plane of the wearer and is located away from the wearer by a predetermined distance is taken as a main gaze line,
  a power distribution on a horizontal cross-section of the right eye lens has a peak at a position that is away from the main gaze line, and
  a power distribution on a horizontal cross-section of the left eye lens has a peak at a position that is away from the main gaze line in a direction opposite to that of the right eye lens.

A second aspect of the present invention is directed to the lenses according to the first aspect,
wherein a degree of separation from the main gaze line of the position of the peak of the power distribution on the horizontal cross-section of the right eye lens is equal to a degree of separation from the main gaze line of the position of the peak of the power distribution on the horizontal cross-section of the left eye lens.

A third aspect of the present invention is directed to the lenses according to the first or second aspect,
wherein a degree of separation from the main gaze line of the position of the peak of the power distribution on the horizontal cross-section of the right eye lens and a degree of separation from the main gaze line of the position of the peak of the power distribution on the horizontal cross-section of the left eye lens, as expressed as an eye rotation angle difference when the line of sight is moved from the main gaze line to a horizontal direction, are both more than 0 and 5 degrees or less.

A fourth aspect of the present invention is directed to the lenses according to any one of the first to third aspects,
wherein the position of the peak of the power distribution on the right eye lens is a position to which an eye is rotated from the main gaze line to the left side as viewed from the wearer, and the position of the peak of the power distribution on the left eye lens is a position to which an eye is rotated from the main gaze line to the right side as viewed from the wearer.

A fifth aspect of the present invention is directed to the lenses according to any one of the first to fourth aspects,
wherein the power distribution has a peak at a position that is away from the main gaze line at least between a distant dioptric power measurement point and a near dioptric power measurement point.

A sixth aspect of the present invention is directed to the lenses according to any one of the first to fifth aspects,
wherein the power distribution has a peak at a position that is away from the main gaze line at least in a near-vision portion.

A seventh aspect of the present invention is directed to the lenses according to any one of the first to sixth aspects,
wherein, when an object that is viewed is expressed by an eye rotation angle difference in which, as viewed from the wearer, movement of the line of sight in a right direction relative to the median plane is taken as positive, and movement of the line of sight in a left direction is taken as negative,
  an eye rotation angle difference indicating an object that is in a line of sight having passed through a peak position of an additional power distribution, in a power distribution that realizes a prescribed power of the right eye on the right eye lens, and an eye rotation angle difference indicating an object that is in a line of sight having passed through a peak position of an additional power distribution, in a power distribution that realizes a prescribed power of the left eye on the left eye lens, have different signs on a horizontal cross-section of lens regions each containing at least part of the main gaze line.

An eighth aspect of the present invention is directed to a design method for a pair of eyeglass lenses including a right eye lens and a left eye lens that are progressive power lenses, including:
  in a case in which each of a portion on the right eye lens and a portion on the left eye lens through which a line of sight passes in a frontal gaze in which a wearer views an object that is located on a median plane of the wearer and is located away from the wearer by a predetermined distance is taken as a main gaze line,
    arranging a peak at a position that is away from the main gaze line, in a power distribution on a horizontal cross-section of the right eye lens; and
    arranging a peak at a position that is away from the main gaze line in a direction opposite to that of the right eye lens, in a power distribution on a horizontal cross-section of the left eye lens.

A ninth aspect of the present invention is directed to the design method according to the eighth aspect, further including:
  a binocular view field coordinate acquiring step of acquiring a right eye power distribution that realizes a prescribed power of the right eye on the right eye lens transformed into binocular view field coordinates, and a left eye power distribution that realizes a prescribed power of the left eye on the left eye lens transformed into binocular view field coordinates, each on a horizontal cross-section of a region containing at least part of the main gaze line;

a power distribution shifting step of shifting the right eye power distribution in one direction, and shifting the left eye power distribution in a direction opposite to the direction in which the right eye power distribution was shifted;

a simulating step of performing a simulation while setting a shift amount of the left eye power distribution to a predetermined value and setting a shift amount of the right eye power distribution to a predetermined value; and a determining step of determining whether or not a simulation result satisfies a predetermined condition.

A tenth aspect of the present invention is directed to the design method according to the eighth or ninth aspect, wherein, when an object that is viewed is expressed by an eye rotation angle difference in which, as viewed from the wearer, movement of the line of sight in a right direction relative to the median plane is taken as positive, and movement of the line of sight in a left direction is taken as negative, setting an eye rotation angle difference indicating an object that is in a line of sight having passed through a peak position of an additional power distribution, in a power distribution that realizes a prescribed power of the right eye on the right eye lens, and an eye rotation angle difference indicating an object that is in a line of sight having passed through a peak position of an additional power distribution, in a power distribution that realizes a prescribed power of the left eye on the left eye lens, to have different signs on a horizontal cross-section of lens regions each containing at least part of the main gaze line.

Other aspects of the present invention that can be combined with the above-described aspects are as follows.

A design method for a pair of eyeglass lenses, wherein a degree of separation from the main gaze line of the position of the peak of the power distribution on the horizontal cross-section of the right eye lens is equal to a degree of separation from the main gaze line of the position of the peak of the power distribution on the horizontal cross-section of the left eye lens.

A design method for a pair of eyeglass lenses, wherein a degree of separation from the main gaze line of the position of the peak of the power distribution on the horizontal cross-section of the right eye lens and a degree of separation from the main gaze line of the position of the peak of the power distribution on the horizontal cross-section of the left eye lens, as expressed as an eye rotation angle difference when the line of sight is moved from the main gaze line to a horizontal direction, are both more than 0 and 5 degrees or less.

A design method for a pair of eyeglass lenses, wherein the position of the peak of the power distribution on the right eye lens is a position to which an eye is rotated from the main gaze line to the left side as viewed from the wearer, and the position of the peak of the power distribution on the left eye lens is a position to which an eye is rotated from the main gaze line to the right side as viewed from the wearer.

A design method for a pair of eyeglass lenses, wherein a region containing at least part of the main gaze line contains at least a near-vision portion.

A design method for a pair of eyeglass lenses, wherein a region containing at least part of the main gaze line is between a distant dioptric power measurement point and a near dioptric power measurement point.

The maximum powers of the two peaks (the Y coordinates of the peak positions) are each at the near dioptric power or less.

The absolute values of the rotation angle differences (differences of the two degrees of separation) at the peak positions of the left and right power distributions do not have to be exactly equal to each other, and may be different from each other, for example, by 1, or 2 degrees or less.

There is no limitation on the lower limit of each of the degree of separation from the main gaze line of the position of the peak of the power distribution on the horizontal cross-section of the right eye lens and the degree of separation from the main gaze line of the position of the peak of the power distribution on the horizontal cross-section of the left eye lens, as expressed as an eye rotation angle difference when the line of sight is moved from the main gaze line to a horizontal direction, but the lowest value may be, for example, 3 degrees.

It is preferable that the preparing step is as follows. In the preparing step, the power distributions of the two lenses are designed using a similar method to that of conventional examples. It will be appreciated that, at that time, the wearer's order information (prescribed power, pupillary distance PD, etc.) is input to a system (an input step), a design parameter is calculated (a design parameter calculating step), and the power distributions of the two lenses are designed based on the design parameter (a power distribution designing step). Examples of the design parameter include a power distribution and an aberration distribution.

In the power shifting step, it is preferable that plots are not shifted in the Y direction but are shifted in the X direction.

It is preferable that a simulation is performed while the shift amounts of the plots are each set to a predetermined value (a simulating step). Furthermore, it is preferable that it is determined whether or not a result of the simulation satisfies a predetermined condition (e.g., power error tolerance, amplitude of accommodation, contrast sensitivity, etc.) (a determining step). Furthermore, it is preferable that, if the condition is satisfied, the designing is ended, otherwise, the shift amounts of the plots are changed or other content is changed, and then a design parameter is re-calculated. Furthermore, it is preferable that this operation is repeated until the simulation result satisfies the predetermined condition.

It is preferable that the pair of progressive power lenses and related techniques thereof according to an aspect of the present invention are prescribed as follows.

"A pair of progressive power lenses and related techniques thereof satisfying Evaluation Conditions (1) and (2) below and having a monocular maximum power positional difference d within ±3 degrees (preferably ±2 degrees, and more preferably ±1.5 degrees) of the larger-the-better characteristic value of (3).

(1) (Monocular maximum power MP−binocular frontal gaze average power BP)≤0.25 D, (2) (Binocular frontal gaze average power BP−additional power)>0 D, and (3) Visual field width W (larger-the-better property) at a value that is lower than the additional power by 0.50 D (preferably 0.25 D)."

Note that the technical idea of the present invention is also reflected in a system that realizes the design method for a pair of eyeglass lenses according to an aspect of the present invention, and a program for causing a computer to realize the design method.

The configuration of the system is as follows.

"A design system for a pair of progressive power lenses including a right eye lens and a left eye lens that are progressive power lenses, wherein, in a case in which each of a portion on the right eye lens and a portion on the left eye lens through which a line of sight passes in a frontal gaze in which a wearer views an object that is located on a median plane of the wearer and is located away from the wearer by a predetermined distance is taken as a main gaze line, a power distribution on a horizontal cross-section of the right eye lens has a peak at a position that is away from the main gaze line, and a power distribution on a horizontal cross-section of the left eye lens has a peak at a position that is away from the main gaze line in a direction opposite to that of the right eye lens."

The configuration of the program is as follows.

"A program for designing a pair of progressive power lenses including a right eye lens and a left eye lens that are progressive power lenses, for causing a computer to:

in a case in which each of a portion on the right eye lens and a portion on the left eye lens through which a line of sight passes in a frontal gaze in which a wearer views an object that is located on a median plane of the wearer and is located away from the wearer by a predetermined distance is taken as a main gaze line, arrange a peak at a position that is away from the main gaze line, in a power distribution on a horizontal cross-section of the right eye lens; and arrange a peak at a position that is away from the main gaze line in a direction opposite to that of the right eye lens, in a power distribution on a horizontal cross-section of the left eye lens."

According to an embodiment of the present invention, it is possible to provide a technique for improving the wearing comfort in binocular vision.

DETAILED DESCRIPTION OF THE INVENTION

Hereinafter, an embodiment of the present invention will be described. The following description with reference to the drawings is merely an example, and the invention is not limited to the aspects given as an example.

Figure 1:
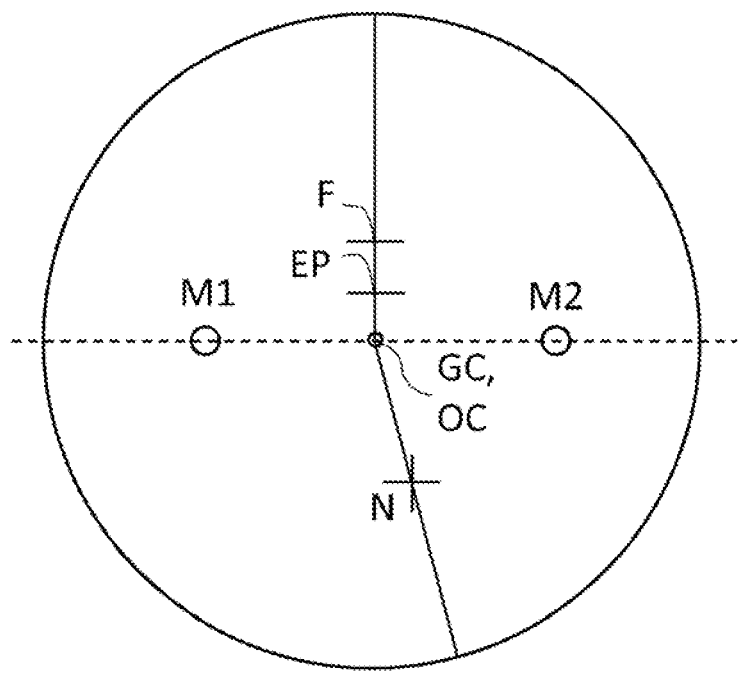
FIG. 1 is a schematic view illustrating a progressive power lens.
Figure 2:
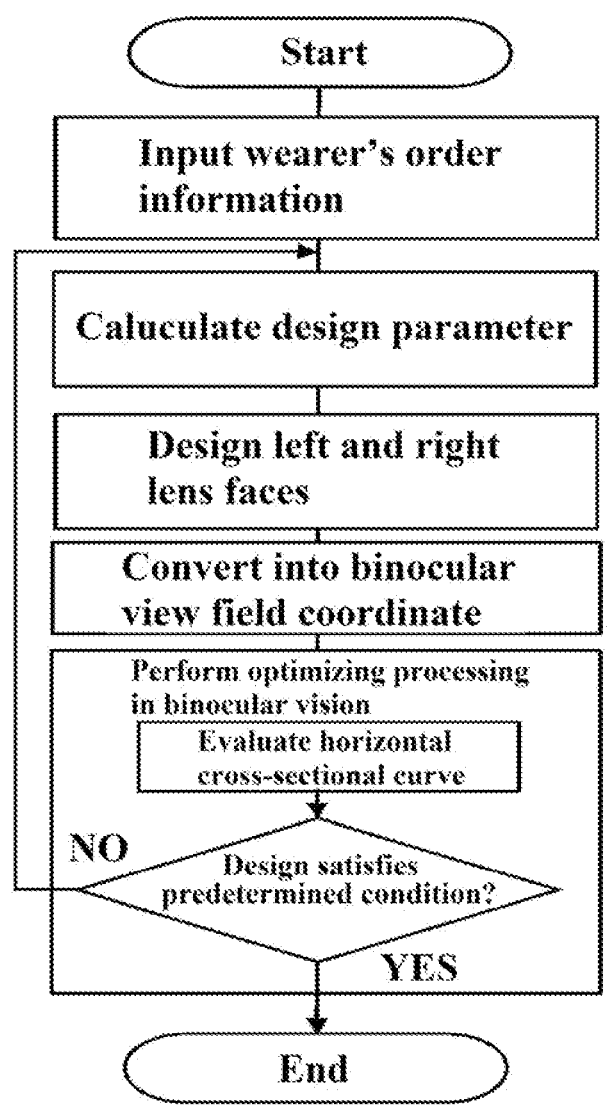
FIG. 2 is a flowchart illustrating a design method of a pair of progressive power lenses according to an aspect of the present invention.

FIG. 1 is a schematic view illustrating a progressive power lens.

Definition

A progressive power lens according to an aspect of the present invention has an object-side face and an eye-side face. An "object-side face" is a surface that is located on the object side when eyeglasses including the progressive power lens are worn by a wearer, and an "eye-side face" is the opposite thereof, that is, a surface that is located on the eye side when the eyeglasses including the progressive power lens are worn by the wearer.

In an aspect of the present invention, both a right eye lens and a left eye lens are progressive power lenses, and these two progressive power lenses are collectively referred to as two lenses or a pair of progressive power lenses.

Each progressive power lens has a distant-vision portion provided in the upper portion of the lens and having a refractive power for use in distant vision, a near-vision portion provided in the lower portion of the lens and having a refractive power for use in near vision, and an intermediate portion provided spanning from the distant-vision portion to the near-vision portion and having a refractive power that gradually changes from the distant-vision portion to the near-vision portion.

Note that there is no particular limitation on the distant-vision portion, as long as it is a region for viewing a distance that is farther than a near distance. For example, it is also possible that the distant-vision portion is not a region for viewing the infinite distance but for viewing a predetermined distance (approximately 1 m). Examples of eyeglass lenses including such a region include an intermediate-near lens corresponding to an object distance from an intermediate distance (1 m to 40 cm) to a near distance (40 cm to 10 cm), and a near-near lens corresponding to an object distance within the near distance.

The main gaze line in an aspect of the present invention refers to, as its name suggests, a line formed extending through convergence of portions on the progressive power lens through which the line of sight passes when a wearer wearing the progressive power lens shifts his or her line of sight from the top direction in the top-bottom direction (hereinafter, referred to as an "upper direction") to the bottom direction (hereinafter, referred to as a "lower direction"). The main gaze line is the basis when designing a progressive power lens.

In an aspect of the present invention, the portion on each progressive power lens through which the line of sight passes, in a frontal gaze in which a wearer wearing the pair of progressive power lenses views an object that is located on a median plane of the wearer and is located away from the wearer by a predetermined distance, is defined as the main gaze line. In an aspect of the present invention, the rotation angle difference (the rotation angle difference in the horizontal direction) from the frontal gaze state is prescribed.

Note that an aspect of the present invention is characterized in that the peak positions of the power distributions on a horizontal cross-section of the right eye lens and the left eye lens are shifted from each other in opposite directions in the horizontal direction, and there is no limitation on the shape of the main gaze line (which may be either a straight line or a curved line). Considering the fact that the shape of the main gaze line may change from wearer to wearer, it is not necessary to uniformly prescribe the shape and the position of the main gaze line (e.g., as constant coordinate values) as constituting the progressive power lens according to an aspect of the present invention. If a wearer is specified, it is possible to specify the main gaze line by specifying the position on the lens through which the line of sight passes when the wearer actually wearing the pair of progressive power lenses gazes forward.

The eye rotation angle (alternatively referred to as an "angle of sight") is such that the range within a radius of 4.5 mm to 25 mm from a lens center (an optical center OC or a geometric center GC) approximately corresponds to a rotation angle of 10 degrees or more and 45 degrees or less. The eye rotation angle and the positional relationship on the eyeglass lens corresponding thereto are described in, for example, Japanese Patent No. 2131365, JP 2016-26324A, and the like, and thus a description thereof has been omitted.

The distant dioptric power measurement point is a point at which a spherical refractive power and a cylindrical refractive power described in prescription data of wearer information are imparted to the progressive power lens. The spherical refractive power refers to a so-called spherical power S, and the cylindrical refractive power refers to a so-called cylindrical power C. The distant dioptric power measurement point (which may be hereinafter simply referred to as a "measurement point F" or a "point F") is a point that is positioned, for example, on a meridian (a perpendicular line that passes through the lens center (specifically, a perpendicular line that passes through the midpoint between two hidden marks M1 and M2)) and is away from the horizontal line connecting the two hidden marks M1 and M2 toward the distant-vision portion by 8.0 mm.

The fitting point or eye point (represented as "EP") is a position through which the line of sight is assumed to pass when a wearer wearing the progressive power lens faces directly forward. Typically, EP is located lower than the measurement point F by several millimeters. In FIG. 1, the geometric center GC and the optical center OC are located at the midpoint between the hidden marks M1 and M2, and FP is located thereabove. Furthermore, the prism reference point matches OC.

The near dioptric power measurement point is a point corresponding to a state in which an additional power ADD is added to a spherical refractive power described in prescription data of wearer information, and is a point at which spherical refractive power+ADD is realized for the first time when viewed from the upper portion to the lower portion of the lens. The near-vision portion measurement point (which may be hereinafter simply referred to as a "measurement point N" or a "point N") is also located on the main gaze line. Note that a change in the refractive power typically starts below the measurement point F and ends above the measurement point N, and a change in the refractive power often starts from the FP in the case of a bifocal progressive power lens.

It is possible to specify the measurement point F, the fitting point or eye point EP and the measurement point N, by referring to a remark chart or a centration chart issued by a lens manufacturer.

Note that the horizontal direction matches the direction of a horizontal standard line connecting two alignment standard marks (so-called hidden marks M1 and M2) for fitting to the frame, and the horizontal standard line is a line extending in the horizontal direction at the midpoint between the upper vertex and the lower vertex of the progressive power lens (a round lens before fitting to the frame). Furthermore, in an aspect of the present invention, an example will be described in which hidden marks M1 and M2 are arranged such that the main gaze line passes through the center of the horizontal standard line connecting the two hidden marks M1 and M2.

Incidentally, the prescription data of wearer information is written on a lens bag of the progressive power lens. That is to say, with the lens bag, it is possible to specify a progressive power lens as being a lens that is based on the prescription data of wearer information. The progressive power lens is typically combined with the lens bag. Thus, the technical idea of the present invention is also reflected in the progressive power lens combined with the lens bag, and the same applies to the set of the lens bag and the progressive power lens.

Pair of Progressive Power Lenses

An aspect of the present invention is as follows.

"A pair of progressive power lenses including a right eye lens and a left eye lens that are progressive power lenses, wherein, in a case in which each of a portion on the right eye lens and a portion on the left eye lens through which a line of sight passes in a frontal gaze in which a wearer views an object that is located on a median plane of the wearer and is located away from the wearer by a predetermined distance is taken as a main gaze line, a power distribution on a horizontal cross-section of the right eye lens has a peak at a position that is away from the main gaze line, and a power distribution on a horizontal cross-section of the left eye lens has a peak at a position that is away from the main gaze line in a direction opposite to that of the right eye lens."

This configuration can be expressed in the XY coordinates as follows.

"A pair of progressive power lenses, wherein, in a case in which an eye rotation angle difference when the line of sight is moved from the main gaze line to a horizontal direction is taken as an X axis (a plus sign when an eye is rotated from the main gaze line to the right side as viewed from the wearer, and a minus sign when an eye is rotated from the main gaze line to the left side as viewed from the wearer), and a power is taken as a Y axis, an X coordinate of a peak of a power distribution that realizes a prescribed power of the right eye on the right eye lens and an X coordinate of a peak of a power distribution that realizes a prescribed power of the left eye on the left eye lens are each shifted from X=0, each on a horizontal cross-section of a region containing at least part of the main gaze line, and shift directions of the two X coordinates on the X axis are opposite to each other."

Each of the right eye lens and the left eye lens according to an aspect of the present invention is also provided with a measurement point F, a fitting point or eye point EP, a measurement point N, and two hidden marks M1 and M2.

A region containing at least part of the main gaze line is selected. This region is a region when the progressive power lens is viewed from the object-side face, and is a linear region or a planar region. If a planar region is selected, a plot on a horizontal cross-section described in the following paragraph satisfies Conditions 1 and 2 below at any position of the planar region (i.e., in the entire region of the planar region).

In a plot in which an eye rotation angle from the main gaze line to a horizontal direction is taken as an X axis (a plus sign when an eye is rotated to the right side as viewed from the wearer, and a minus sign when an eye is rotated to the left side as viewed from the wearer), and a power is taken as a Y axis, the following conditions are satisfied.

(Condition 1) An X coordinate of a peak of a power distribution that realizes a prescribed power of the right eye on the right eye lens and an X coordinate of a peak of a power distribution that realizes a prescribed power of the left eye on the left eye lens are each shifted from X=0, each on a horizontal cross-section of a region containing at least part of the main gaze line.

(Condition 2) Shift directions of the two X coordinates on the X axis are opposite to each other.

In an aspect of the present invention, a power distribution that realizes a prescribed power of the right eye is a power distribution excluding an irregular increase or decrease in the power due to deformation of the peripheral edge caused by production of the progressive power lens.

If Conditions 1 and 2 above are both satisfied, it is possible to prevent a power error from occurring as a result of intentionally adding power. As a result, the wearing comfort is improved in binocular vision.

Details of Pair of Progressive Power Lenses (Preferred Examples and Modified Examples)

The technical scope of the present invention is not limited to the foregoing embodiment, and also encompasses modes that have undergone various improvements and modifications in a range that allows the specific effects obtained by the constituent elements of the invention and combination thereof to be derived.

It is preferable that an absolute value of the X coordinate of the peak of the power distribution on the right eye lens is equal to an absolute value of the X coordinate of the peak of the power distribution on the left eye lens (Preferred Example 1). In the case in which the peak of the power distribution is shifted from X=0 in the X direction, the wearing comfort in binocular vision is likely to be improved when the shift amounts of the right eye lens and the left eye lens are not excessively different from each other. Note that the absolute values do not have to be exactly equal to each other, and may be different from each other, for example, by 1, or 2 degrees or less.

Preferred Example 1 above can be expressed as follows.

"A degree of separation from the main gaze line of the position of the peak of the power distribution on the horizontal cross-section of the right eye lens is equal to a degree of separation from the main gaze line of the position of the peak of the power distribution on the horizontal cross-section of the left eye lens."

It is preferable that an absolute value of the X coordinate of the peak of the power distribution on the right eye lens and an absolute value of the X coordinate of the peak of the power distribution on the left eye lens are each more than 0 and 5 degrees or less ($0<|X|\leq 5$ degrees) (Preferred Example 2). The powers on the main gaze lines are likely to be properly ensured, and an object that is located at a predetermined distance is likely to be clearly viewed in a binocular frontal gaze, when the peak positions of the power distributions are not excessively away from the main gaze lines.

Preferred Example 2 above can be expressed as follows.

"A degree of separation from the main gaze line of the position of the peak of the power distribution on the horizontal cross-section of the right eye lens and a degree of separation from the main gaze line of the position of the peak of the power distribution on the horizontal cross-section of the left eye lens, as expressed as an eye rotation angle difference when the line of sight is moved from the main gaze line to a horizontal direction, are both more than 0 and 5 degrees or less."

It is preferable that the X coordinate of the peak of the power distribution on the right eye lens has a minus sign, and the X coordinate of the peak of the power distribution on the left eye lens has a plus sign (Preferred Example 3). As will be shown in later-described examples, with this configuration, it is possible to reduce the accommodation amount used by the wearer's eyes mainly in side directions, in binocular vision of an object that is located at a predetermined distance away from the wearer. Accordingly, it is possible to reduce strain on the wearer.

It will be appreciated that there is a concern that the power on the main gaze line may decrease compared with conventional examples. However, in tests in later-described examples, according to an aspect of the present invention, the wearing comfort for a wearer was improved, and a decrease in the power on the main gaze line was not seen as a problem. Instead, an advantage in that a wearer has a wider field of view and strain is reduced outweighs the content of the above-described concern.

Preferred Example 3 above can be expressed as follows.

"The position of the peak of the power distribution on the right eye lens is a position to which an eye is rotated from the main gaze line to the left side as viewed from the wearer, and the position of the peak of the power distribution on the left eye lens is a position to which an eye is rotated from the main gaze line to the right side as viewed from the wearer."

It is preferable that a region containing at least part of the main gaze line between the measurement point F and the measurement point N is prescribed as a region for obtaining the plot in the horizontal cross-section. Furthermore, the above-mentioned conditions may also be satisfied on the plot in a region other than this region. Meanwhile, the wearer's line of sight is unlikely to pass through a portion above the measurement point F on the main gaze line, and the effects of the present invention can be achieved even in a case in which the above-mentioned conditions are not satisfied. The same applies to a portion below the measurement point N.

There is no limitation on the region containing at least part of the main gaze line, as long as the above-mentioned conditions are satisfied in a region on the lens according to the visual range of operations frequently performed by the wearer, that is, the operation distance.

Note that it is preferable that the region containing at least part of the main gaze line contains at least a near-vision portion (in particular, the measurement point N). The near dioptric power is higher than the distant dioptric power, and thus an issue of power errors is likely to occur. Thus, if an aspect of the present invention is applied to the near-vision portion, the effects of the present invention are more prominent. Note that the above-mentioned conditions may be satisfied on the plot on a horizontal cross-section of a linear region containing the measurement point N.

The present invention does not exclude that there is a region in which a peak is located on the main gaze line. For example, the present invention does not exclude that a peak of a power distribution on a horizontal cross-section of a region containing at least part of the main gaze line and corresponding to a predetermined object distance between the distant-vision distance and the near-vision distance is located on the main gaze line.

However, the technical idea of the present invention is that peaks of power distributions in binocular vision are actively away from the main gaze line in opposite directions, so that the peak width of the power distribution in binocular vision is increased while accepting that the peak power cannot be obtained in a frontal gaze direction. Thus, even in the case in which there is a region in which a peak is located on the main gaze line, it is preferable that a peak is not located on the main gaze line in most of the portion between the measurement point F and the measurement point N (e.g., 50% or more, and preferably 70% or more of the portion between the measurement point F and the measurement point N as viewed in the vertical direction).

The Y coordinate of the peak of the power distribution on the right eye lens and the Y coordinate of the peak of the power distribution on the left eye lens may also be different from each other. These Y coordinate values correspond to the prescribed power of the right eye lens (distant dioptric power+additional power, that is, the near dioptric power) and the prescribed power of the left eye lens (distant dioptric power+additional power, that is, the near dioptric power). If the prescribed powers are different between both eyes, the Y coordinate values are naturally different as well. This state is alternatively referred to as anisometropia.

It is also possible that the Y coordinates of the two peaks are each set to the near dioptric power or less. For example, in the progressive power lens according to an aspect of the present invention, there may be a case in which power is not intentionally added. That is to say, it is also possible that the power distribution is shifted in the X direction instead of the Y direction. At this time, the Y coordinates of the two peaks are still the near dioptric power. At this time, the Y coordinates of the plots in portions other than the peaks are naturally less than the near dioptric power.

If this configuration is adopted, contrary to JP 2011-203705A, power errors that occur as a result of intentionally adding power do not occur, and the wearer's vision is unlikely to be blurred and an image does not become distorted, and thus the wearing comfort can be further improved.

On the other hand, the present invention cannot prevent the Y coordinates of the two peaks from exceeding the near dioptric power. Even in that case, it is possible to improve the wearing comfort in binocular vision compared with the invention described in Patent Document 2, by setting the peaks of the power distributions on the right eye lens and the left eye lens to opposite plus/minus signs (in particular, setting the X coordinate of the peak on the right eye lens to the minus sign and setting the X coordinate of the peak on the left eye lens to the plus sign).

Design Method for Pair of Eyeglass Lenses

Hereinafter, a design method for a pair of eyeglass lenses according to an aspect of the present invention will be described. A description of the content similar to that in "Pair of Progressive Power Lenses" above has been omitted.

The configuration of a design method for a pair of eyeglass lenses according to an aspect of the present invention is as follows.

"A design method for a pair of eyeglass lenses including a right eye lens and a left eye lens that are progressive power lenses, including:

in a case in which each of a portion on the right eye lens and a portion on the left eye lens through which a line of sight passes in a frontal gaze in which a wearer views an object that is located on a median plane of the wearer and is located away from the wearer by a predetermined distance is taken as a main gaze line,
  arranging a peak at a position that is away from the main gaze line, in a power distribution on a horizontal cross-section of the right eye lens; and
  arranging a peak at a position that is away from the main gaze line in a direction opposite to that of the right eye lens, in a power distribution on a horizontal cross-section of the left eye lens."

This configuration can be expressed in the XY coordinates as follows.

"A design method for a pair of eyeglass lenses, including:

in a case in which an eye rotation angle difference when the line of sight is moved from the main gaze line to a horizontal direction is taken as an X axis (a plus sign when an eye is rotated from the main gaze line to the right side as viewed from the wearer, and a minus sign when an eye is rotated from the main gaze line to the left side as viewed from the wearer), and a power is taken as a Y axis,
  shifting each of an X coordinate of the peak of the power distribution that realizes a prescribed power of the right eye on the right eye lens and an X coordinate of the peak of the power distribution that realizes a prescribed power of the left eye on the left eye lens, on a horizontal cross-section of a region containing at least part of the main gaze line between a distant dioptric power measurement point and a near dioptric power measurement point, from X=0,
wherein shift directions of the two X coordinates on the X axis are opposite to each other, and
the Y coordinates of the two peaks are each set to the near dioptric power or less.

In the preparing step, the power distributions of the two lenses are designed using a similar method to that of conventional examples. It will be appreciated that, at that time, the wearer's order information (prescribed power, pupillary distance PD, etc.) is input to a system (an input step performed by an input unit), a design parameter is calculated (a design parameter calculating step performed by a design parameter calculating unit), and the power distributions of the two lenses are designed based on the design parameter (a power distribution designing step performed by a power distribution designing unit). Examples of the design parameter include a power distribution and an aberration distribution. This content can be realized using a similar method to that of conventional examples, and thus a detailed description thereof has been omitted.

In an aspect of the present invention, the plot on a horizontal cross-section of a region containing at least part of the main gaze line is obtained from the design content. The plot may be obtained using a known ray tracing method. The X axis of the plot is alternatively referred to as a binocular view field coordinate. The step of obtaining this plot is alternatively referred to as a binocular view field coordinate acquiring step that is performed by a binocular view field coordinate acquiring unit. This plot is shifted in the X direction (preferably, without being shifted in the Y direction) (a power distribution shifting step performed by a power distribution shifting unit). At that time, the direction in which the plot of the right eye lens is shifted and the direction in which the plot of the left eye lens is shifted are set to be opposite to each other. This step is a power distribution shifting step. Note that preferred examples and modified examples regarding this shift are as described in "Details of Pair of Progressive Power Lenses (Preferred Examples and Modified Examples)".

A simulation is performed while the shift amounts of the plots are each set to a predetermined value (a simulating step performed by a simulating unit). It is determined whether or not a result of the simulation satisfies a predetermined condition (e.g., power error tolerance, amplitude of accommodation, and contrast sensitivity, etc.) (a determining step performed by a determining unit). If the condition is satisfied, the designing is ended, otherwise, the shift amounts of the plots are changed or other content is changed, and then a design parameter is re-calculated. This operation is repeated until the simulation result satisfies the predetermined condition.

It is preferable that the absolute value of an amount by which the right eye power distribution is shifted and the absolute value of an amount by which the left eye power distribution is shifted are equal to each other.

It is preferable that the absolute value of an amount by which the right eye power distribution is shifted and the absolute value of an amount by which the left eye power distribution is shifted are both more than 0 and 5 degrees or less.

It is preferable that the direction in which the right eye power distribution is shifted is the negative direction on the X axis, and the direction in which the left eye power distribution is shifted is the positive direction on the X axis.

It is preferable that the region containing at least part of the main gaze line contains at least a near-vision portion.

Note that the technical idea of the present invention is also reflected in a system that realizes the design method for a pair of eyeglass lenses according to an aspect of the present invention, and a program for causing a computer to realize the design method.

The configuration of the system is as follows.

"A design system for a pair of progressive power lenses including a right eye lens and a left eye lens that are progressive power lenses,
wherein, in a case in which each of a portion on the right eye lens and a portion on the left eye lens through which a line of sight passes in a frontal gaze in which a wearer views an object that is located on a median plane of the wearer and is located away from the wearer by a predetermined distance is taken as a main gaze line, a power distribution on a horizontal cross-section of the right eye lens has a peak at a position that is away from the main gaze line, and a power distribution on a horizontal cross-section of the left eye lens has a peak at a position that is away from the main gaze line in a direction opposite to that of the right eye lens."

The configuration of the program is as follows.

"A program for designing a pair of progressive power lenses including a right eye lens and a left eye lens that are progressive power lenses, for causing a computer to:

in a case in which each of a portion on the right eye lens and a portion on the left eye lens through which a line of sight passes in a frontal gaze in which a wearer views an object that is located on a median plane of the wearer and is located away from the wearer by a predetermined distance is taken as a main gaze line, arrange a peak at a position that is away from the main gaze line, in a power distribution on a horizontal cross-section of the right eye lens; and arrange a peak at a position that is away from the main gaze line in a direction opposite to that of the right eye lens, in a power distribution on a horizontal cross-section of the left eye lens."

EXAMPLES

Hereinafter, the present invention will be specifically described by way of examples. It will be appreciated that the present invention is not limited to the following examples.

Example 1

A pair of eyeglass lenses with a spherical power S of 0.00 D, a cylindrical power C of 0.00 D, and an additional power ADD of 2.00 D were prepared for a wearer A. The monocular pupillary distance of the wearer was set to 32 mm. The near operation distance of operations frequently performed by the wearer was 50 cm. That is to say, the distance of an object in a frontal gaze when obtaining the above-described plots (binocular view field coordinates) was set to 50 cm.

Furthermore, a perpendicular flat object surface was set as an object to be viewed. The perpendicular flat object surface was a flat face located away from the wearer's front side by the near operation distance and was perpendicular to the line of sight from the front.

The wearer's order information was input to a system based on the above-described content, and a design parameter was calculated.

Then, the power distributions of the right eye lens and the left eye lens were designed using a similar method to that of conventional examples. The plots (binocular view field coordinates) were obtained using a ray tracing method on the right eye power distribution and the left eye power distribution obtained in the design.

Figure 3:
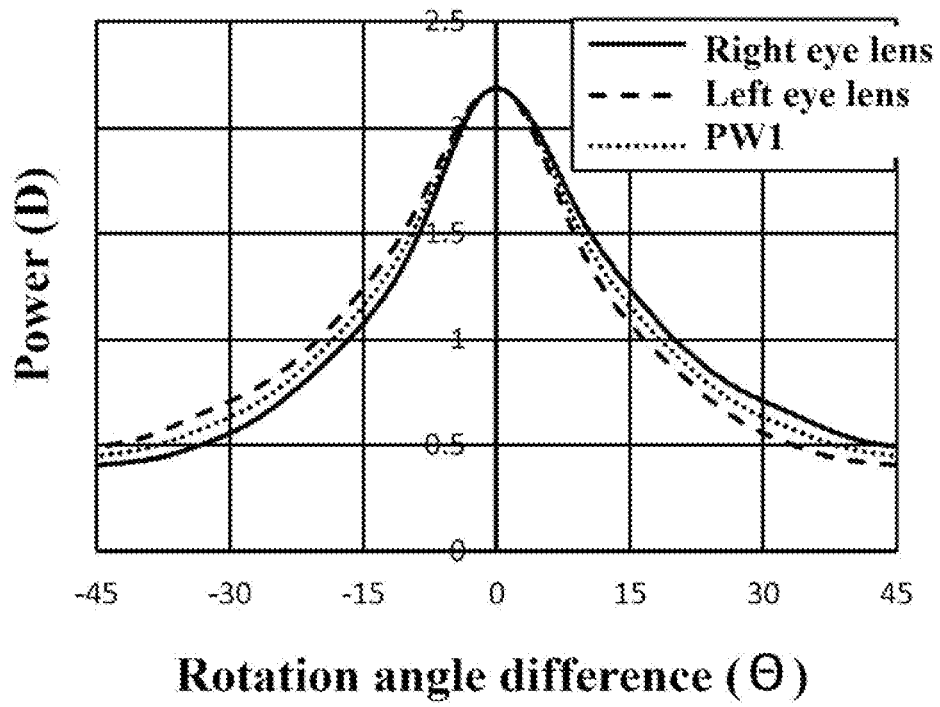
FIG. 3 is a graph showing a right eye power distribution R1, a left eye power distribution L1, and an average value PW1 of the power distributions before shifting the plots (corresponding to Comparative Example 1).

FIG. 3 is a graph showing a right eye power distribution R1, a left eye power distribution L1, and an average value PW1 of the power distributions before shifting the plots (corresponding to Comparative Example 1).

The eye model and other various conditions in the ray tracing are as follows.

Maximum amplitude of accommodation of eye: 0.75 D

Cornea—lens vertex distance (CVD): 14.5 mm

Distance from corneal vertex to eye rotation center: 14.5 mm

These conditions were used in ray tracing hereinafter, unless otherwise described. Note that the present invention is not limited to these conditions.

In the stage shown in FIG. 3, in both of the right eye power distribution and the left eye power distribution, the peaks were located at X=0 as in conventional examples. Then, the right eye power distribution R1 shown in FIG. 3 was shifted in the −X direction by 3 degrees, and the left eye power distribution L1 was shifted in the +X direction by 3 degrees.

Figure 4:
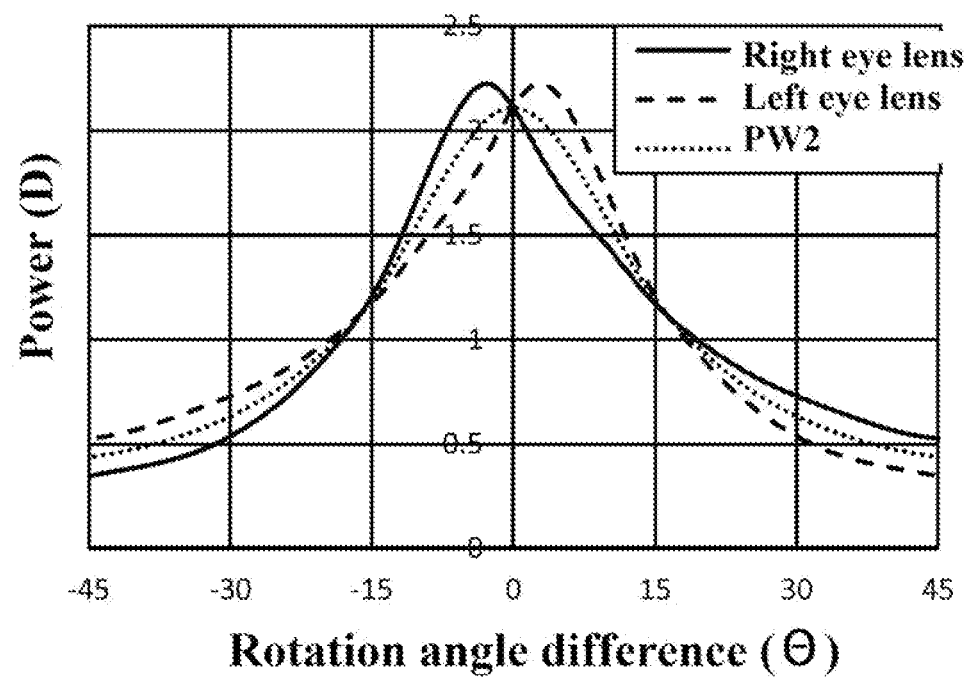
FIG. 4 is a graph showing a right eye power distribution R2, a left eye power distribution L2, and an average value PW2 of the power distributions after shifting the plots (corresponding to Example 1).

FIG. 4 is a graph showing a right eye power distribution R2, a left eye power distribution L2, and an average value PW2 of the power distributions after shifting the plots (corresponding to Example 1).

A near operation distance of 50 cm means that a power of 1/0.5 m=2.0 D is necessary.

It is sufficient that a power of 2.0 D is ensured when the power of a progressive power lens and the amplitude of accommodation of an eye of the wearer A are added. If the amplitude of accommodation of an eye is large, strain on the wearer A increases, whereas, if the amplitude of accommodation of an eye is small, strain on the wearer A decreases.

A difference between the amplitude of accommodation 2.0 D necessary for viewing an object at a near operation distance of 50 cm and the power on a horizontal cross-section containing a portion on the main gaze line through which the line of sight passes when gazing forward at an object at a near operation distance of 50 cm with both eyes was calculated for PW1 and PW2. This difference is the self-accommodation amount (unit: D) required for the wearer A.

Figure 5:
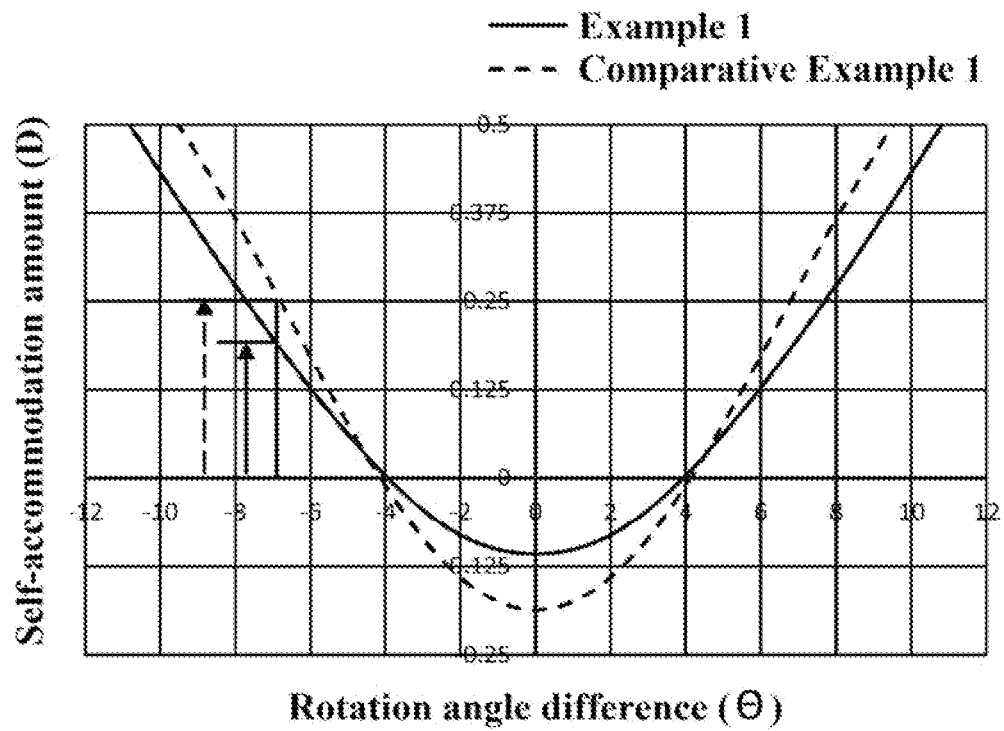
FIG. 5 is a graph according to Example 1 and Comparative Example 1, where the X axis indicates the eye rotation angle difference and the Y axis indicates the self-accommodation amount.

FIG. 5 is a graph according to Example 1 and Comparative Example 1, where the X axis indicates the eye rotation angle difference [unit: deg] and the Y axis indicates the self-accommodation amount [unit: D].

It is seen from FIG. 5 that the self-accommodation amount for PW2 in Example 1 was lower than that for PW1 in Comparative Example 1. The larger the rotation angle difference, the more remarkable this tendency. As a result, the view field region with a small self-accommodation amount is wider in Example 1 than in Comparative Example 1.

Accordingly, power errors from the near dioptric power can be also reduced in a horizontal direction in which the near front is taken as the center, and thus the effects of improving the wearing comfort in binocular vision and reducing strain can be obtained.

Example 2

Example 2 shows the case of anisometropia as an example contrary to Example 1.

A pair of eyeglass lenses as described below were prepared for a wearer B.

Spherical power S of right eye lens: 0.00 D
Cylindrical power C of right eye lens: 0.00 D
Spherical power S of left eye lens: −4.00 D
Cylindrical power C of left eye lens: 0.00 D
Additional power ADD: 3.00 D
Near operation distance: 33.3 cm.

The conditions other than those described above were similar to those of Example 1.

Figure 6:
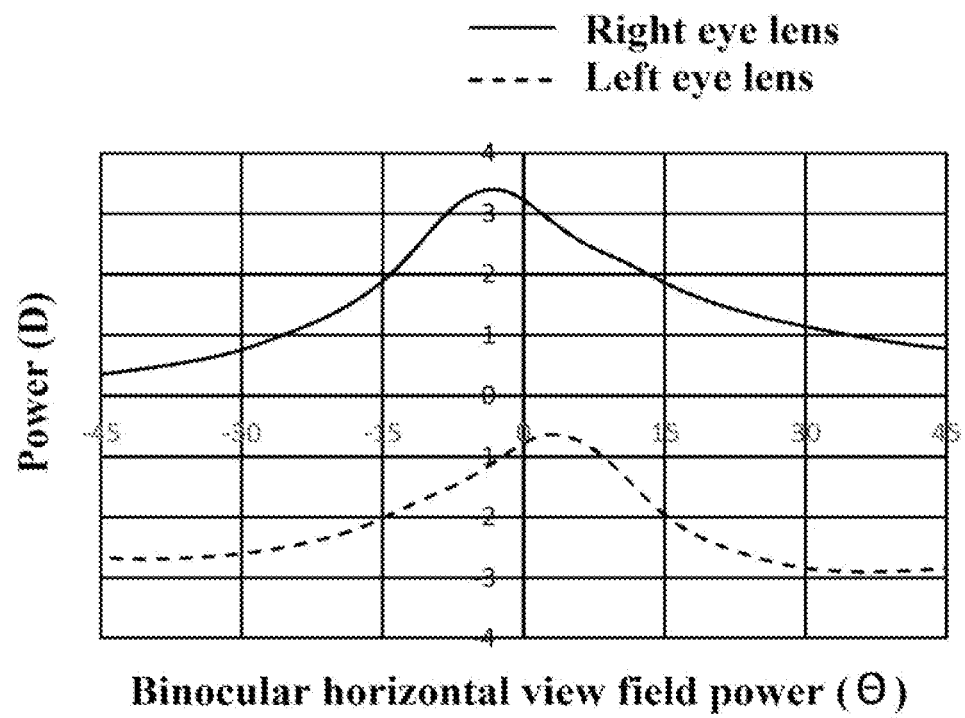
FIG. 6 is a graph showing a right eye power distribution and a left eye power distribution after shifting the plots and before transforming and extracting additional power distributions.

FIG. 6 is a graph showing a right eye power distribution and a left eye power distribution after shifting the plots and before transforming and extracting additional power distributions.

The right eye power distribution shown in FIG. 6 was shifted in the −X direction by 3 degrees, and the left eye power distribution was shifted in the +X direction by 3 degrees.

Hereinafter, an additional power distribution will be described. The additional power distribution in an aspect of the present invention is a power distribution obtained by subtracting a prescribed power distribution (distant dioptric power), which is a power distribution purely corresponding to a prescribed value, from a power distribution for realizing a prescription on an eyeglass lens according to an aspect of the present invention. In an aspect of the present invention, a power distribution on a horizontal cross-section is given as an example, but the present invention is not limited to this aspect.

Figure 7:
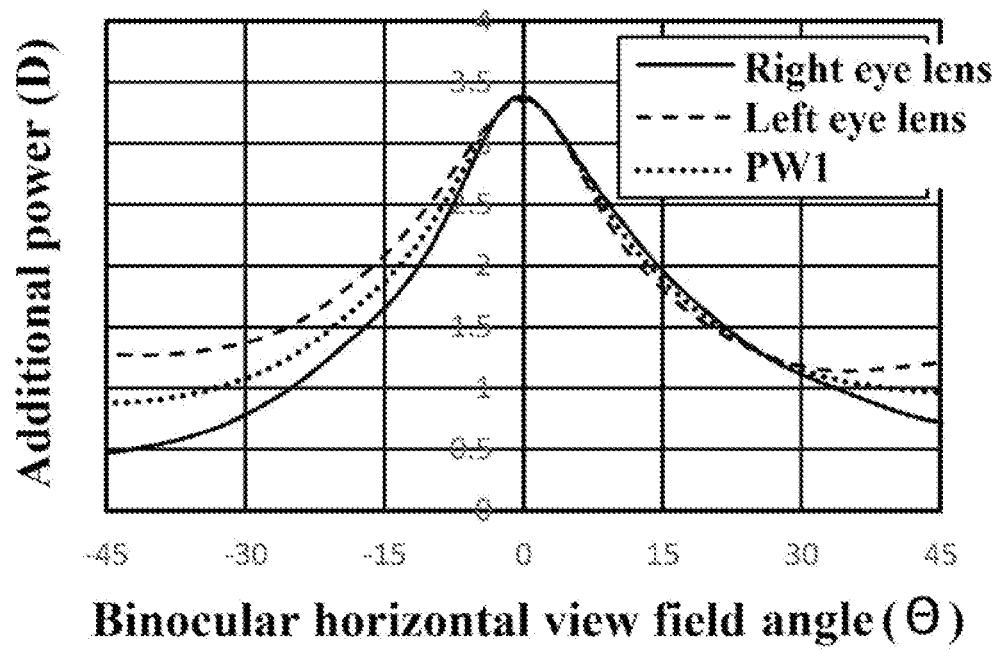
FIG. 7 is a graph showing a right eye power distribution R1, a left eye power distribution L1, and an average value PW1 of the power distributions before shifting the plots (corresponding to Comparative Example 2), as additional power distributions constituting part of the power distributions in FIG. 6.

FIG. 7 is a graph showing a right eye power distribution R1, a left eye power distribution L1, and an average value PW1 of the power distributions before shifting the plots (corresponding to Comparative Example 2), as additional power distributions constituting part of the power distributions in FIG. 6.

Figure 8:
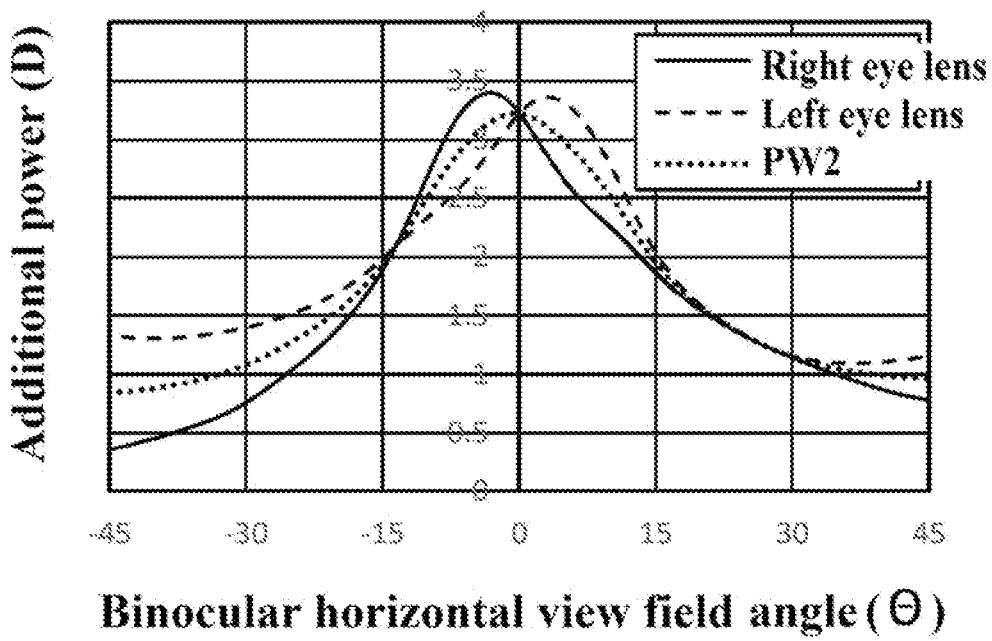
FIG. 8 is a graph showing a right eye power distribution R2, a left eye power distribution L2, and an average value PW2 of the power distributions after shifting the plots (corresponding to Example 2), as additional power distributions constituting part of the power distributions in FIG. 6.

FIG. 8 is a graph showing a right eye power distribution R2, a left eye power distribution L2, and an average value PW2 of the power distributions after shifting the plots (corresponding to Example 2), as additional power distributions constituting part of the power distributions in FIG. 6.

Figure 9:
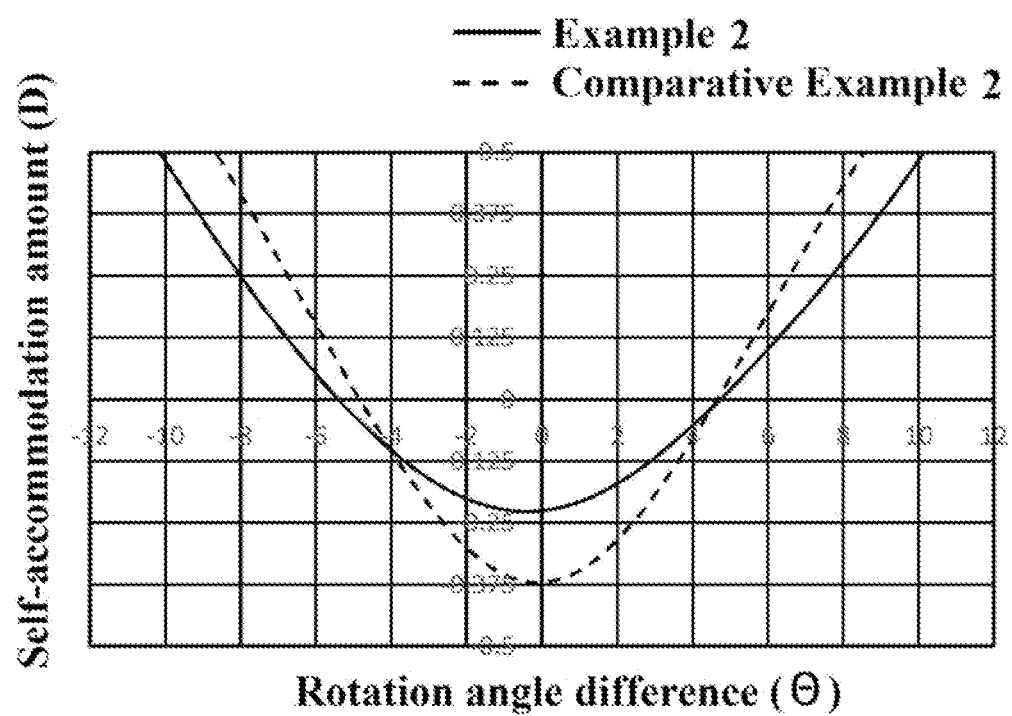
FIG. 9 is a graph according to Example 2 and Comparative Example 2, where the X axis indicates the eye rotation angle difference [unit: deg] and the Y axis indicates the self-accommodation amount [unit: D].

FIG. 9 is a graph according to Example 2 and Comparative Example 2, where the X axis indicates the eye rotation angle difference [unit: deg] and the Y axis indicates the self-accommodation amount [unit: D].

It is seen from FIG. 9 that the self-accommodation amount in Example 2 was lower than that in Comparative Example 2. The larger the rotation angle difference, the more remarkable this tendency. As a result, the view field region with a small self-accommodation amount is wider in Example 2 than in Comparative Example 2.

Accordingly, power errors from the near dioptric power can also be reduced in a horizontal direction in which the near front is taken as the center, and thus the effects of improving the wearing comfort in binocular vision and reducing strain can be obtained.

In consideration of the description above, it is preferable that the pair of progressive power lenses and related techniques thereof according to an aspect of the present invention are prescribed as follows. "When an object that is viewed is expressed by an eye rotation angle difference in which, as viewed from the wearer, movement of the line of sight in a right direction relative to the median plane is taken as positive, and movement of the line of sight in a left direction is taken as negative, an eye rotation angle difference indicating an object that is in a line of sight having passed through a peak position of an additional power distribution, in a power distribution that realizes a prescribed power of the right eye on the right eye lens, and an eye rotation angle difference indicating an object that is in a line of sight having passed through a peak position of an additional power distribution, in a power distribution that realizes a prescribed power of the left eye on the left eye lens, have different signs on a horizontal cross-section of lens regions each containing at least part of the main gaze line."

Note that the prescription "when an object that is viewed is expressed by an eye rotation angle difference in which, as viewed from the wearer, movement of the line of sight in a right direction relative to the median plane is taken as positive, and movement of the line of sight in a left direction is taken as negative" may be applied to an aspect of the present invention or to aspects other than anisometropia.

Example 3

Hereinafter, a test for obtaining preferred values, as expressed as an eye rotation angle difference when the line of sight is moved from the main gaze line to a horizontal direction, was performed regarding a degree of separation from the main gaze line of the position of the peak of the power distribution on the horizontal cross-section of the right eye lens and a degree of separation from the main gaze line of the position of the peak of the power distribution on the horizontal cross-section of the left eye lens.

Figure 10:
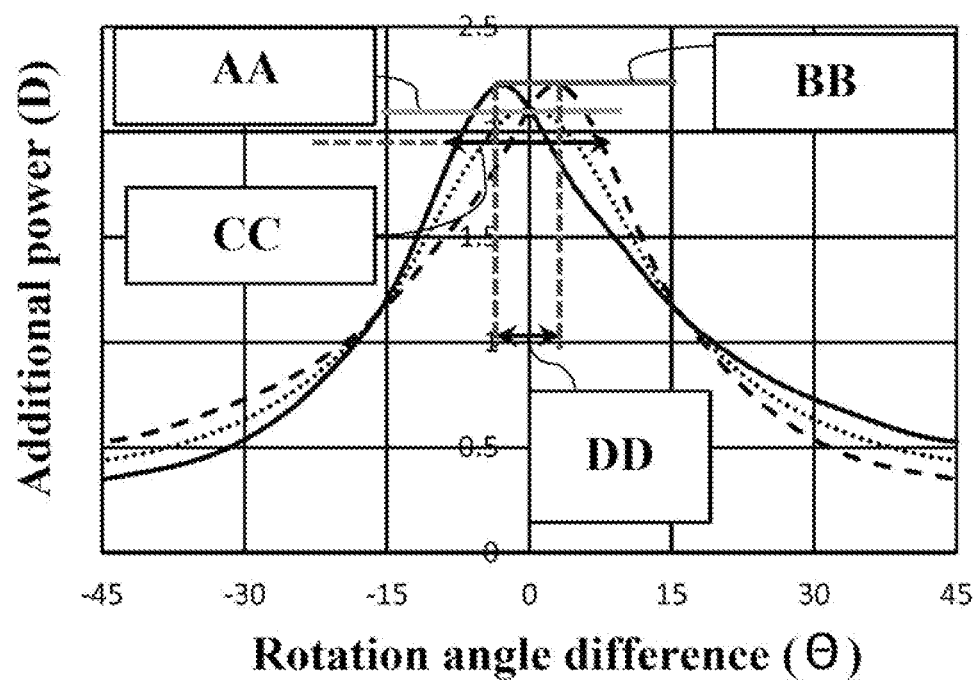
FIG. 10 is a graph showing, as power distributions, additional powers obtained through transformation and extraction from FIG. 4, where points corresponding to a monocular maximum power MP, a binocular frontal gaze average power BP, a visual field width W at a threshold, and a monocular maximum power positional difference d are illustrated.

FIG. 10 is a graph showing, as power distributions, additional powers obtained through transformation and extraction from FIG. 4, where points corresponding to a monocular maximum power MP, a binocular frontal gaze average power BP, a visual field width W at a threshold, and a monocular maximum power positional difference d are illustrated. The maximum values of the additional powers of the left and right eyes are each taken as a monocular maximum power MP, and an average value of the additional powers at binocular frontal gaze, that is, at the rotation angle difference 0 is taken as a binocular frontal gaze average power BP.

In FIG. 10, the monocular maximum powers MP of the left and right eyes are the same, but, if they are different from each other, the maximum value of the additional power of either one of the eyes may be taken as the monocular maximum power MP, or an average of the maximum values of the additional powers of the left and right eyes may be taken as the monocular maximum power MP.

In order to obtain an optimal amount of rotation angle difference, which is a shift amount, the following evaluation conditions are set.

(1) (Monocular maximum power MP−binocular frontal gaze average power BP)≤0.25 D

In the case in which there is a significant difference between the monocular maximum power and the binocular front power, the wearer is likely to have a sense of unnaturalness when viewing objects, and thus this condition is a condition for preventing such a case from occurring.

The monocular maximum power is defined using an additional power distribution obtained through transformation and extraction.

(2) (Binocular frontal gaze average power BP−additional power)>0 D

In the case in which the binocular frontal gaze average power BP is significantly lower than the additional power as a prescription, it may be difficult for the wearer to view an object due to blurring in a frontal gaze. Thus, with this condition, an attenuation value of the binocular frontal gaze average power is evaluated.

(3) Visual field width W (larger-the-better property) at threshold

This condition indicates a visual field width at which the power that is lower than the additional power as a prescription by 0.50 D, and preferably 0.25 D is ensured. This corresponds to a view field range in which the wearer can see an object clearly with a self-accommodation amount of 0.25 D (or 0.50 D). W has a larger-the-better property, that is, the larger the W, the better the result.

Note that the monocular maximum power positional difference d refers to, as its name suggests, a value obtained by subtracting the X coordinate [deg] of the peak on the left eye lens from the X coordinate [deg] of the peak on the right eye lens.

A pair of eyeglass lenses with a spherical power S of 0.00 D, a cylindrical power C of 0.00 D, and an additional power ADD of 3.00 D were prepared for the wearer A. Furthermore, the near operation distance was set to 33.3 cm. A test was performed while conditions other than those described above were set to be similar to those of Example 1.

Figure 11:
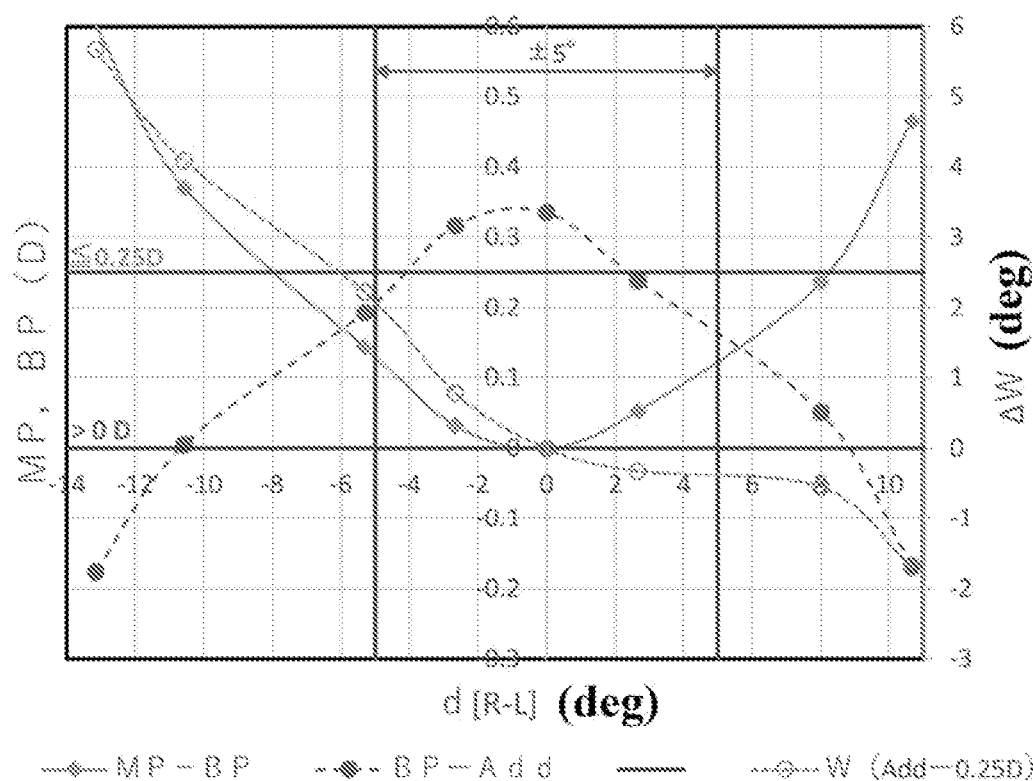
FIG. 11 is a graph according to Example 3, where the X axis indicates the monocular maximum power positional difference d [deg], the central Y axis according to Evaluation Conditions (1) and (2) indicates the power difference [D], and the right Y axis according to Evaluation Condition (3) indicates the visual field width [deg] at a threshold.

FIG. 11 is a graph according to Example 3, where the X axis indicates the monocular maximum power positional difference d [deg], the central Y axis according to Evaluation Conditions (1) and (2) indicates the power difference [D], and the right Y axis according to Evaluation Condition (3) indicates the relative change amount [deg] of the visual field width at a threshold. The relative change amount ΔW of the visual field width at a threshold is calculated by subtracting a visual field width W0 at a threshold before shifting the additional power distributions of the left and right eyes in the X direction, from the visual field width W at the threshold after shifting the additional power distributions. That is to say, ΔW=W−W0.

As shown in FIG. 11, (1) and (2) are satisfied in a region defined by the upper and lower horizontal straight lines. The visual field width W at the threshold of (3) has a larger-the-better property. As a result, the larger-the-better characteristic value of (3) (i.e., the maximum value at the visual field width W at the threshold in the region) is a value that is slightly lower than −6 degrees. As a result, it is preferable that the monocular maximum power positional difference d is −7 degrees (preferably −6 degrees) or more and −5 degrees or less. A monocular maximum power positional difference d of −5 degrees means that the X coordinate of the right eye lens is negative, and the Y coordinate of the right eye lens is positive. This matches an example described in the preferred examples in the aspect of the present invention.

In consideration of the description above, it is preferable that the pair of progressive power lenses and related techniques thereof according to an aspect of the present invention are prescribed as follows.

"A pair of progressive power lenses and related techniques thereof satisfying Evaluation Conditions (1) and (2) below and having a monocular maximum power positional difference d within ±3 degrees (preferably ±2 degrees, and more preferably ±1.5 degrees) of the larger-the-better characteristic value of (3).

(1) (Monocular maximum power MP−binocular frontal gaze average power BP)≤0.25 D, (2) (Binocular frontal gaze average power BP−additional power)>0 D, and (3) Visual field width W (larger-the-better property) at a value that is lower than the additional power by 0.50 D (preferably 0.25 D)."

What is claimed is:

1. A pair of progressive power lenses comprising a right eye lens and a left eye lens,
wherein, in a case in which each of a portion on the right eye lens and a portion on the left eye lens through which a line of sight passes in a frontal gaze in which a wearer views an object that is located on a median plane of the wearer and is located away from the wearer by a predetermined distance is taken as a main gaze line,
in order to make a visual field width at a predetermined power threshold wider than when a peak of a power distribution on a horizontal cross-section of the right eye lens and a peak of a power distribution on a horizontal cross-section of the left eye lens are on the main gaze line, the power distribution on the horizontal cross-section of the right eye lens has the peak at a position that is away from the main gaze line toward a nose side or an ear side thereof, and the power distribution on the horizontal cross-section of the left eye lens has the peak at a position that is away from the main gaze line toward a nose side or an ear side thereof in a direction opposite to that of the right eye lens.

2. The pair of progressive power lenses according to claim 1, wherein a degree of separation from the main gaze line of the position of the peak of the power distribution on the horizontal cross-section of the right eye lens is equal to a degree of separation from the main gaze line of the position of the peak of the power distribution on the horizontal cross-section of the left eye lens.

3. The pair of progressive power lenses according to claim 1, wherein a degree of separation from the main gaze line of the position of the peak of the power distribution on the horizontal cross-section of the right eye lens and a degree of separation from the main gaze line of the position of the peak of the power distribution on the horizontal cross-section of the left eye lens, as expressed as an eye rotation angle difference when the line of sight is moved from the main gaze line to a horizontal direction, are both more than 0 and 5 degrees or less.

4. The pair of progressive power lenses according to claim 1, wherein the position of the peak of the power distribution on the right eye lens is a position to which an eye is rotated from the main gaze line to a left side as viewed from the wearer, and the position of the peak of the power distribution on the left eye lens is a position to which an eye is rotated from the main gaze line to a right side as viewed from the wearer.

5. The pair of progressive power lenses according to claim 1, wherein the power distribution on the right eye lens or the left eye lens has a peak at a position that is away from the main gaze line at least between a distant dioptric power measurement point and a near dioptric power measurement point.

6. The pair of progressive power lenses according to claim 1, wherein the power distribution on the right eye lens or the left eye lens has a peak at a position that is away from the main gaze line at least in a near-vision portion.

7. The pair of progressive power lenses according to claim 1, wherein, when an object that is viewed is expressed by an eye rotation angle difference in which, as viewed from the wearer, movement of the line of sight in a right direction relative to the median plane is taken as positive, and movement of the line of sight in a left direction is taken as negative, an eye rotation angle difference indicating an object that is in a line of sight having passed through a peak position of an additional power distribution, in a power distribution that realizes a prescribed power of the right eye on the right eye lens, and an eye rotation angle difference indicating an object that is in the line of sight having passed through a peak position of an additional power distribution, in a power distribution that realizes a prescribed power of the left eye on the left eye lens, have different signs on horizontal cross-sections of lens regions each containing at least part of the main gaze line.

8. A design method for a pair of eyeglass lenses including a right eye lens and a left eye lens that are progressive power lenses, comprising:

in a case in which each of a portion on the right eye lens and a portion on the left eye lens through which a line of sight passes in a frontal gaze in which a wearer views an object that is located on a median plane of the wearer and is located away from the wearer by a predetermined distance is taken as a main gaze line, in order to make a visual field width at a predetermined power threshold wider than when a peak of a power distribution on a horizontal cross-section of the right eye lens and a peak of a power distribution on a horizontal cross-section of the left eye lens are on the main gaze line, arranging the peak at a position that is away from the main gaze line toward a nose side or an ear side thereof, in the power distribution on the horizontal cross-section of the right eye lens; and arranging the peak at a position that is away from the main gaze line toward a nose side or an ear side thereof in the direction opposite to that of the right eye lens, in the power distribution on the horizontal cross-section of the left eye lens.

9. The design method for a pair of progressive power lenses according to claim 8, further comprising:

a binocular view field coordinate acquiring step of acquiring a right eye power distribution that realizes a prescribed power of the right eye on the right eye lens transformed into binocular view field coordinates, and a left eye power distribution that realizes a prescribed power of the left eye on the left eye lens transformed into binocular view field coordinates, each on the horizontal cross-section of a region containing at least part of the main gaze line;

a power distribution shifting step of shifting the right eye power distribution in one direction, and shifting the left eye power distribution in a direction opposite to the direction in which the right eye power distribution was shifted;

a simulating step of performing a simulation while setting a shift amount of the left eye power distribution to a predetermined value and setting a shift amount of the right eye power distribution to a predetermined value; and a determining step of determining whether or not a simulation result satisfies a predetermined condition.

10. The design method for a pair of progressive power lenses according to claim 8, wherein, when an object that is viewed is expressed by an eye rotation angle difference in which, as viewed from the wearer, movement of the line of sight in a right direction relative to the median plane is taken as positive, and movement of the line of sight in a left direction is taken as negative, setting an eye rotation angle difference indicating an object that is in a line of sight having passed through a peak position of an additional power distribution, in a power distribution that realizes a prescribed power of the right eye on the right eye lens, and an eye rotation angle difference indicating an object that is in the line of sight having passed through a peak position of an additional power distribution, in a power distribution that realizes a prescribed power of the left eye on the left eye lens, to have different signs on horizontal cross-sections of lens regions each containing at least part of the main gaze line.

* * * * *